Dec. 30, 1930.  W. C. WARD  1,787,294
SAFETY DEVICE FOR AIRCRAFT
Filed Oct. 1, 1928
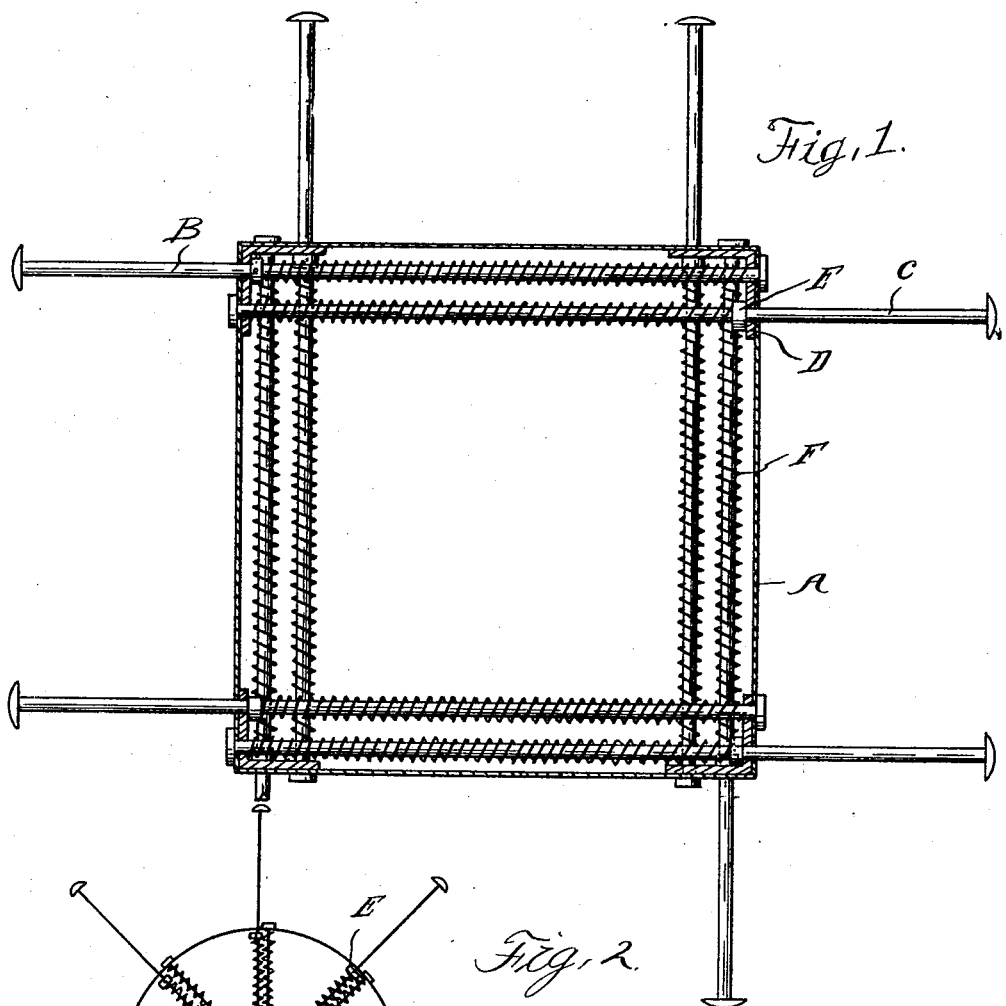
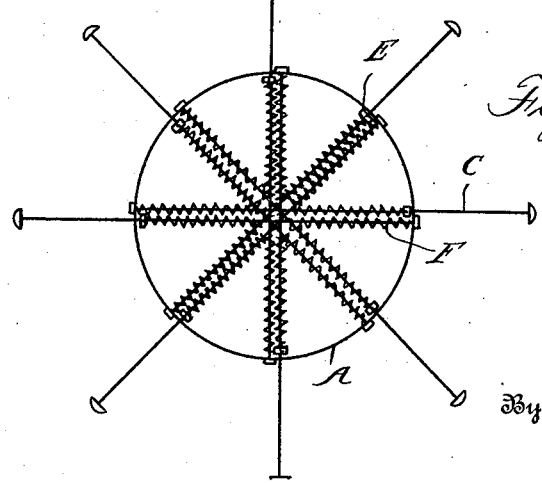
Inventor
Willis C. Ward
By Whittemore Hulbert
Whittemore & Belknap
Attorneys Patented Dec. 30, 1930

1,787,294

UNITED STATES PATENT OFFICE

WILLIS C. WARD, OF ORCHARD LAKE, MICHIGAN

SAFETY DEVICE FOR AIRCRAFT

Application filed October 1, 1928. Serial No. 309,528.

This invention relates to safety devices adapted to be applied to various constructions of aircraft but more particularly to the fuselage of a heavier than air machine. In such construction in case of a crash the fuselage may be in any position so that any one of its sides may first receive the impact. It is therefore an object of my invention to cushion the shock whichever way the machine may be turned, and to this end the invention consists in the construction hereinafter set forth.

In the drawings:

Figure 1 represents a cross section through the fuselage of an aeroplane showing my improvement attached thereto;

Figure 2 is a similar diagrammatic view showing a modified construction.

As shown in Figure 1, A represents the shell of a fuselage of an aeroplane which as shown is of substantially rectangular cross section. Within the shell of this fuselage and adjacent to the respective sides thereof are parallel rods or tubes B and C which project beyond the opposite sides of the fuselage which are adjacent to the sides parallel to the rods. This arrangement provides two of such rods projecting beyond each side of the fuselage and at opposite edge portions thereof. The rods B and C slidably engage bearings D anchored within the shell and each rod has thereon a collar E for engaging a spiral spring F sleeved on the portion of the rod within the fuselage. This spring abuts against one of the bearings D, the arrangement being such that any impact applied to the projecting ends of the rods which tends to telescope them or force them inward will be yieldably resisted by the spiral spring F. Thus in case of an accident, each side of the fuselage is protected from direct impact with the ground and the shock is cushioned by the telescopic movement of the rods under the resistance of the springs F.

In the modified construction shown in Figure 2 the fuselage instead of being square in cross section is circular. In this case the telescopic rods are arranged radially, the construction being the same as shown in Figure 1.

I am aware that such a construction will only absorb a portion of the shock but it may nevertheless be instrumental in saving a life or preventing injury.

What I claim as my invention is:

1. The combintion with the fuselage of an aircraft, of telescopic rods projecting beyond each of the sides thereof and resilient means for opposing the inward telescoping of the rods and thereby absorbing a portion of the shock.

2. The combination with a fuselage of an aircraft, or pairs of telescopic rods projecting beyond each of the sides thereof and respectively adjacent to the transversely extending sides, each of said rods having resilient means for opposing the inward telescoping thereof, and thereby absorbing a portion of the shock.

3. In an aircraft, the combination with a fuselage of substantially rectangular cross-section, of rods arranged adjacent and parallel to each side thereof and projecting beyond a transversely extending side, each of said rods having sleeved thereon a spiral spring, a collar on the rod engaging said spring and an abutment on the fuselage for the opposite end of said spring whereby the inward telescopic movement of said rod is opposed by said spring and a part of the shock is absorbed thereby.

4. In an aircraft, the combination with a fuselage, of a plurality of rods extending completely through said fuselage in different directions and projecting beyond one wall of the same, a spring sleeved upon the portion of said rod within the fuselage and abutting against the wall thereof opposite to that beyond which the rod projects, and a collar on said rod within the fuselage engaging the opposite end of said spring whereby a shock applied to the projecting end of the rod may be partly absorbed by said spring.

In testimony whereof I affix my signature.

WILLIS C. WARD.